United States Patent [19]

Schneider

[11] Patent Number: 5,055,673
[45] Date of Patent: Oct. 8, 1991

[54] RADIATION CHOPPER HAVING A CHOPPER DISK DRIVEN BY AN ELECTROMOTOR

[75] Inventor: Rudolf Schneider, Hanau, Fed. Rep. of Germany

[73] Assignee: Leybold Aktiengesellschaft, Hanau I, Fed. Rep. of Germany

[21] Appl. No.: 489,428

[22] Filed: Mar. 6, 1990

[30] Foreign Application Priority Data

Dec. 23, 1989 [DE] Fed. Rep. of Germany ....... 3942821

[51] Int. Cl.⁵ ............................................. G01D 5/36
[52] U.S. Cl. .................................... 250/233; 250/351
[58] Field of Search ......................... 250/233, 576, 351

[56] References Cited

U.S. PATENT DOCUMENTS 3,693,024 9/1972 Hulle et al. ..................... 250/233
4,132,890 1/1979 Garcia et al. ..................... 250/233
4,155,010 5/1979 Schunck et al. .
4,719,352 1/1988 Miyatake et al. .

FOREIGN PATENT DOCUMENTS 3129580 6/1982 Fed. Rep. of Germany .

Primary Examiner—David C. Nelms
Assistant Examiner—K. Shami
Attorney, Agent, or Firm—Felfe & Lynch

[57] ABSTRACT

A radiation chopper has a chopper disk 9 which is driven by an electromotor 8 and disposed between a front and a rear part of the housing 2, 3 placed on top of each other wherein the rear part 3 of the housing has a multi-armed yoke 5 and the front part 2 of the housing has a support for at least one cell and at least one aperture 17, 18 permitting the radiation to pass from the chopper chamber 10 to the cell and at least one support 38, 39 disposed at the rear part 3 of the housing for mounting the radiation source. At each of its two ends, the motor 8 for driving the chopper disk 9 has one bearing collar 13, 15 of which the one in the rear can be inserted into a borehole 14 provided in the multi-armed yoke 5 which in turn is connected to supports 4, 4', ... that are configured as one piece with the rear part 3 of the housing and the front bearing collar 15 engages a borehole 16 which is provided at the bottom of the supports 4, 4', ... in the rear part 3 of the housing.

11 Claims, 4 Drawing Sheets

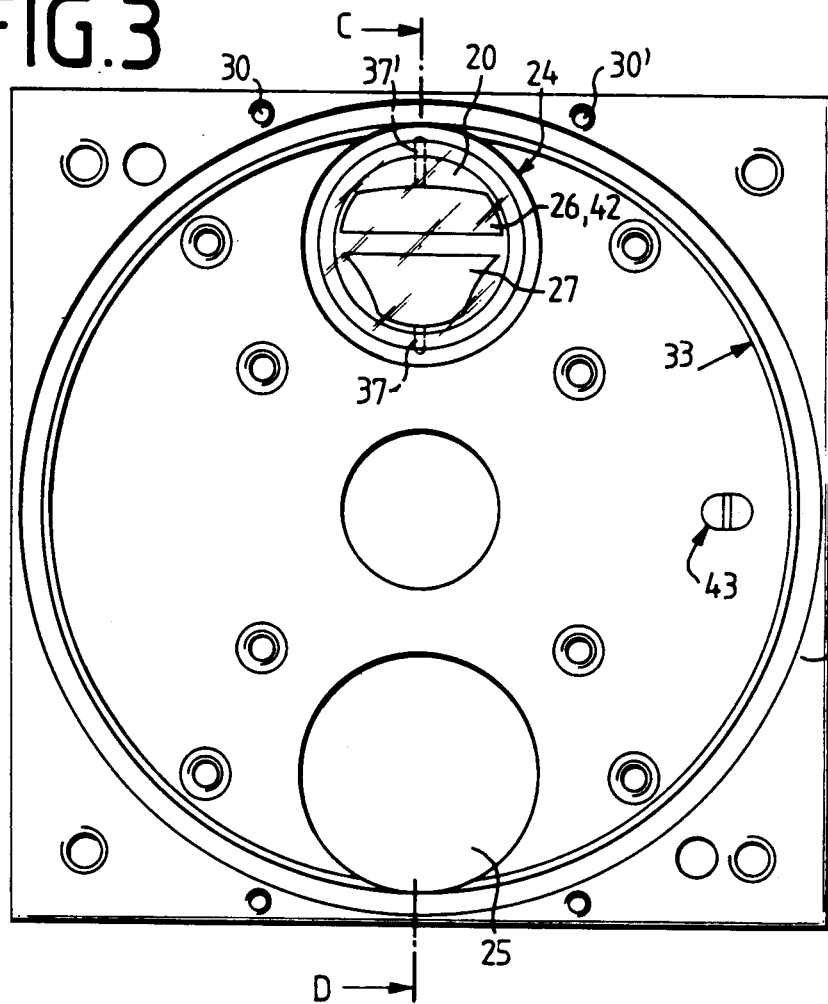
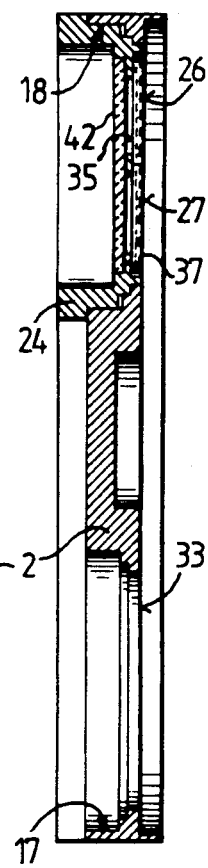
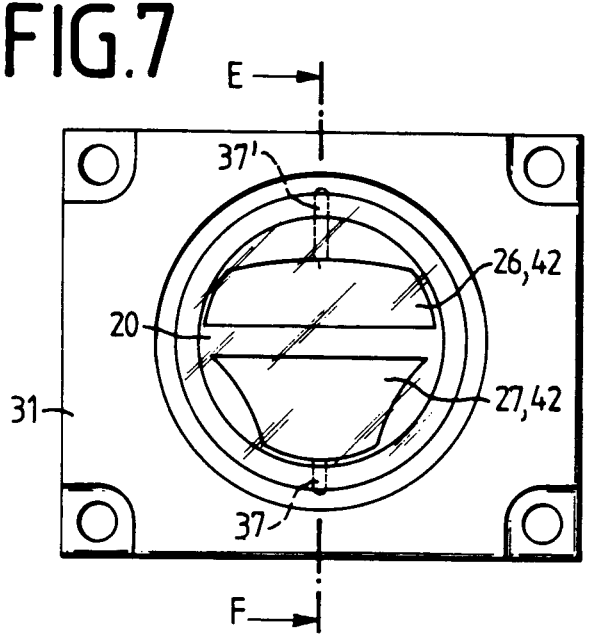
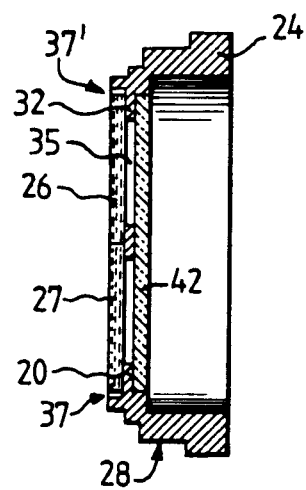

RADIATION CHOPPER HAVING A CHOPPER DISK DRIVEN BY AN ELECTROMOTOR

BACKGROUND OF THE INVENTION

The invention relates to a radiation chopper having a chopper disk disposed in a chopper chamber between a first housing part and a second housing part. The front part has a support for a cell containing the substance to be analyzed, and the rear part has a mount for a radiation source directed toward the cell.

Optical chopper disks are preferably used in analytical devices for determining the absorption capacity of a solid, liquid or gaseous substance.

The purpose of such disks is to shortly interrupt one or several light beams that directly or indirectly impinge on a light-sensitive sensor. This interruption and the subsequent release of the light beam is also referred to as light modulation.

In many cases this light modulation serves to separate the actual measuring signal from interfering signals. In multi-channel analytical devices a chopper disk can be used to interrupt or release the light in a first channel at a first time and the light in a second channel at a second time.

Choppers are already known for devices for measuring the optical absorption capacity which includes a Ferraris-motor comprising one chopper disk and two electromagnetic systems (German OS 26 08 669, to which U.S. Pat. No. 4,155,010 corresponds). When choppers of this kind are realized, it turned out that the chopper disk easily becomes skewed and is subject to a temperature drift.

Further, a chopper of the kind in question (German OS 37 23 177) is known where the chopper disk is disposed between two housing parts that are on top of each other. The one part has a bearing whereas the other part has an recess in which the bearing can be introduced. An additional recess is disposed on the side of the one part of the housing which faces the other part. The depth of this recess essentially corresponds to the thickness of the chopper disk. This part is provided with a bearing for the one end of a shaft supporting the chopper disk.

SUMMARY OF THE INVENTION

It is an object of the present invention to provide a chopper which can be mounted quickly and easily and where the positioning procedures for the precise running of the chopper disk can be reduced to a minimum. It should be possible to replace the necessary filters, cells and light sources without affecting the bearing or guiding of the chopper disk itself or bringing it out of alignment. Finally, the chopper should be composed of components that can be manufactured at low cost.

This object is achieved in that the motor for the chopper disk drive has a bearing collar at each end where the on at the rear end can be inserted into a borehole provided in a multi-armed yoke. The yoke in turn is connected to supports that are configured as one piece with the rear part of the housing. The bearing collar at the front engages a borehole which is provided in the rear part of the housing at the bottom of the supports.

BRIEF DESCRIPTION OF THE DRAWINGS

FIG. 3 is a top view of the front part of housing looked at from the rear, FIG. 4 is a longitudinal section taken along line C-D of FIG. 3 across the front part of the housing inclusive of the inserted filtering diaphragm and an upstream glass pane.

FIGS. 7 and 8 are an enlarged top view of the filtering diaphragm and a cross section across lines E-F of FIG. 7.

DETAILED DESCRIPTION OF THE PREFERRED EMBODIMENT

Figure 1:
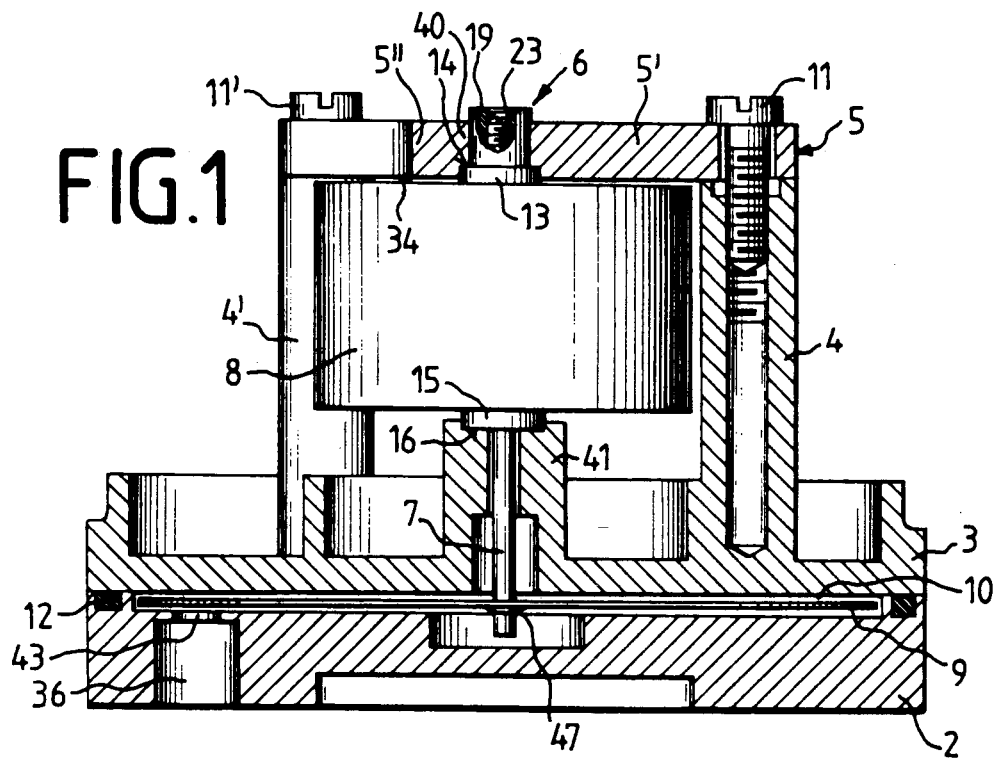
FIG. 1 is a cross sectional view of the chopper along lines A-B of FIG. 6. The housing of the device essentially comprises a front and a rear part, a stepping motor, a chopper disk, a filtering diaphragm and a three-armed yoke for supporting and guiding the stepping motor.
Figure 6:
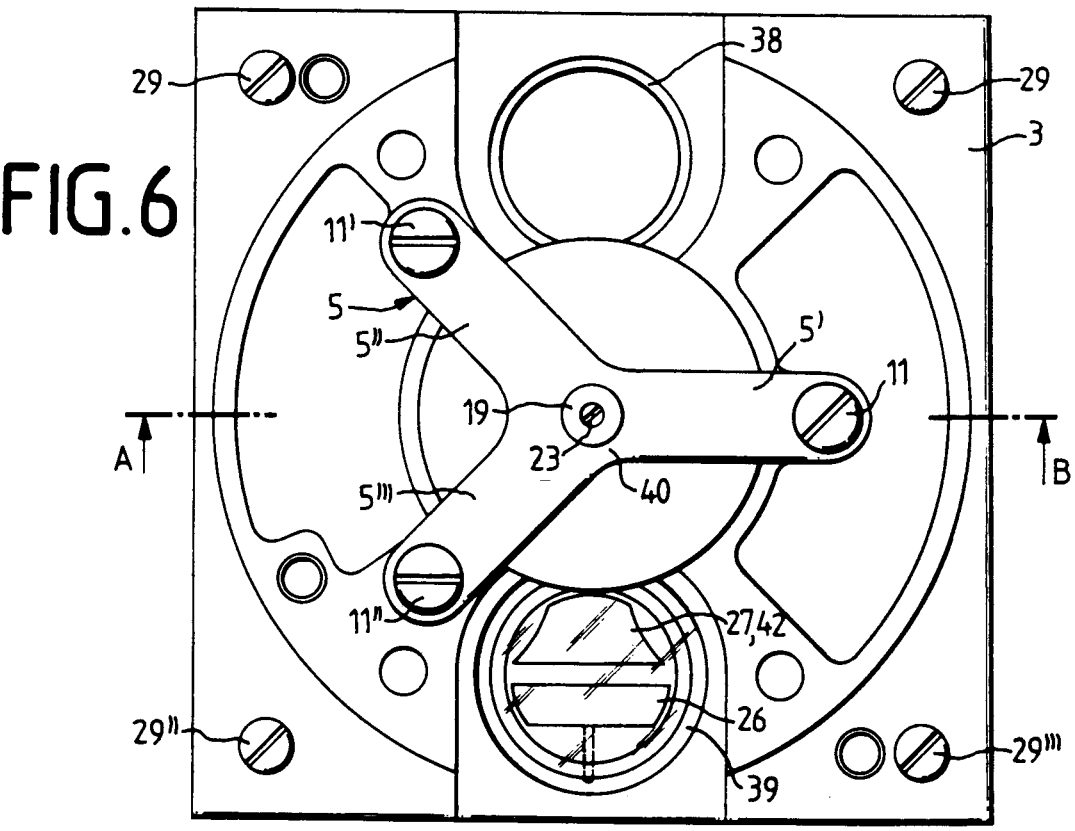
FIG. 6 is a top view of the chopper, looked at from the rear with the yoke screwed on, the stepping motor added and the filtering diaphragm and the glass pane inserted.

According to the sectional view of FIG. 1, the chopper essentially has two housing parts, a front part 2 and a rear part 3. The rear part 3 of the housing has a total of three supports 4, 4', 4" which are configured as one piece with the housing. The free ends of the supports are connected to one another (FIG. 6) via a three-armed yoke 5. The latter has the counter bearing 6 for the motor shaft 7 of a stepping motor 8 which drives the chopper disk 9. This disk run in a chopper chamber 10 formed by a flat recess 33 between the two parts 2 and 3 of the housing which are connected to each other by means of screws 29, 29', . . .

It must be ensured that the chopper disk 9 can run in the very flat chopper chamber 10 which is sealed toward the exterior by means of sealing ring 12, without touching the wall of this chamber 10, i.e. the parts 2 and 3 of the housing. For this purpose, the one end of the motor 8 is supported with its rear bearing collar 13 in a correspondingly dimensioned stepped borehole 14 of the yoke 5 and with the bearing collar 15 at the front end, it is guided in the borehole 16 in the bearing block 41 of the rear part 3 of the housing.

Figure 2:
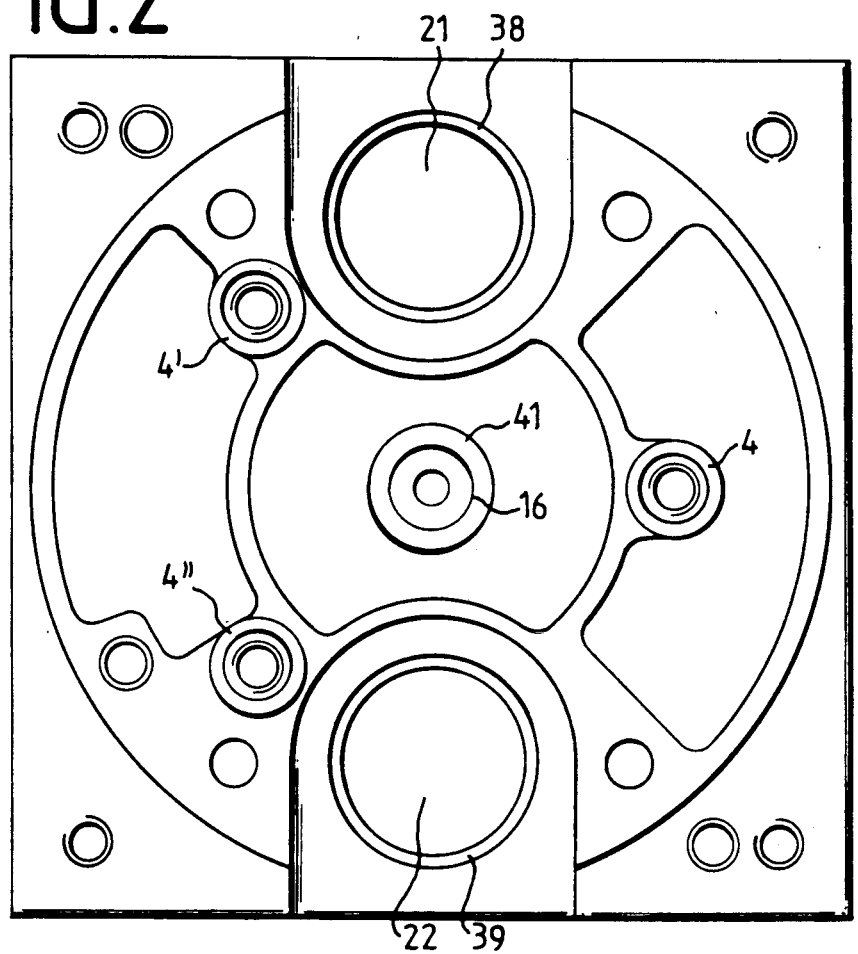
FIG. 2 is a top view of the rear housing part without yoke, stepping motor and filtering diaphragm.
Figure 5:
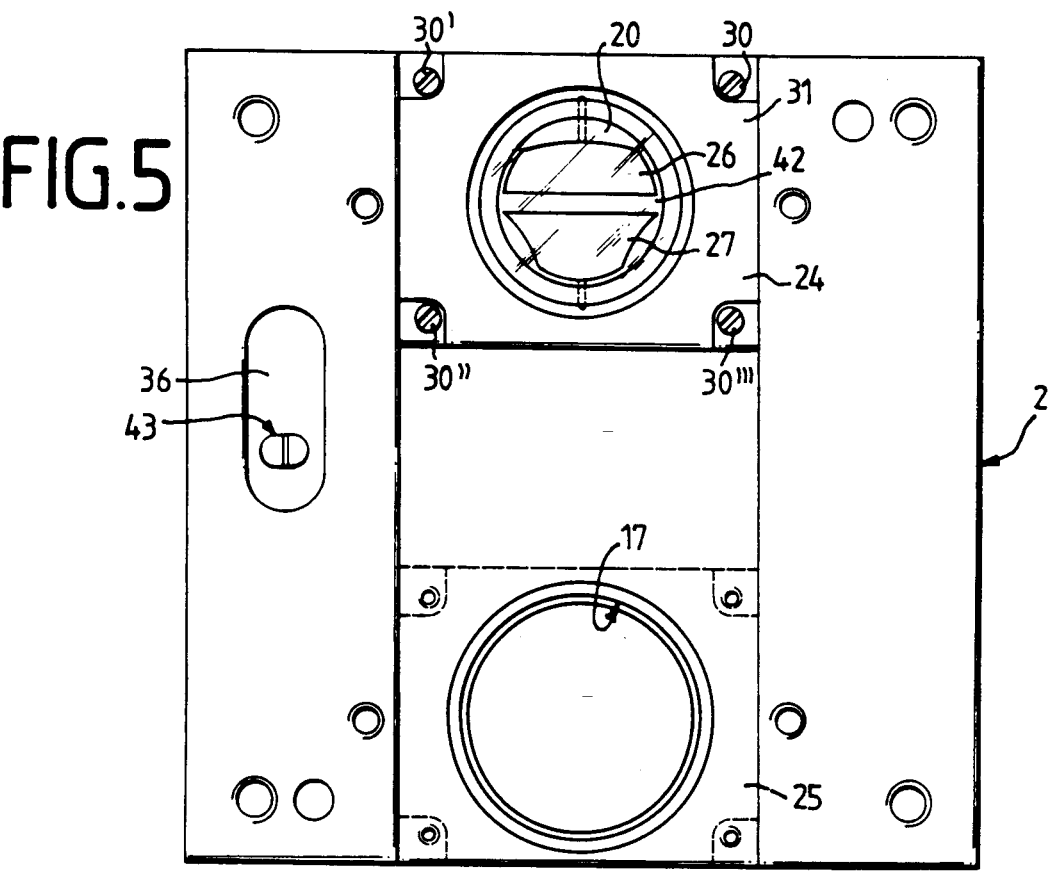
FIG. 5 is a top view of the front part of the housing with the filtering diaphragm screwed on, looked at from the front side.

As seen in FIG. 2, the rear part 3 has two apertures 21, through which light from infrared light radiators (not represented in further detail) mounted in recesses 38, 39 can fall onto cells (not represented in further detail) which are inserted in recesses 17, 18 provided in the front part 2 of the housing (cf. FIG. 4).

The chopper disk driven 9 by motor 8 can rotate in the flat recess 33 or chopper chamber 10. By means of a screw 23, it is possible to adjust the exact position of the shaft 7 to the front parts 2 and 3. The one end or head thereof acts on the rear surface of the shaft 7 which in turn is mounted in a bushing 19 in the center portion 40 of the yoke 5 and counter bearing 6.

As it can be seen from FIGS. 3, 4, 5 and 6, the embodiment represented has a filtering diaphragm 24 with a glass pane 42 disposed in front, both of which are inserted in the recess 18. Screws 30, 30', . . . connect the frame 20 thereof to the front part 2 of the housing. The recess 17 in the front part 2 of the housing can be sealed by a blind flange 25 which can also be screwed to the part 2 (in FIG. 5, this blind flange 25 is represented in phantom).

FIGS. 7 and 8 are an enlarged representation of the diaphragm holder 24. It includes a rectangular, plate-like part 31 to which a cylindrical attachment 28 is added having an external as well as internal diameter that corresponds to the recesses 17 and 18. A glass pane 42 and two filters 26, 27 are glued into a membrane-like bottom part 32 that has apertures. Moreover, there is a milled space 37 connecting the gap between the glass pane 42 and the filters 26, 27 to the chopper chamber 10.

As it can be seen from the FIGS. (particularly FIG. 1), the stepping motor 8 is held and guided at the circumference of the bearing collar 13 and bearing collar 15 by means of yoke 5 that is supported at three points. The alignment of the two boreholes 14, 16 to one another is maintained very precisely (e.g. to 0.01 mm).

The three-point support of the yoke 5 on the support elements 4, 4', 4" permit a particularly precise alignment of the chopper disk 9 with respect to the very flat recess 10 in the front part 2 of the housing.

It is a particular advantage of this design that the motor 8 can be easily mounted. The axial tolerance of the motor shaft 7 is for this purpose set to zero by means of a setting screw 23. The head of the setting screw 23 serves as a counter bearing for the contact pressure when the hub 47 of the chopper disk 9 is pressed on. (Following the mounting of the motor 8, the shaft 7 is connected to the chopper disk 9 and pressed against the setting screw 23 so that while the chopper disk 9 is being pressed on, the shaft cannot be pressed out of its bearings in the motor nor can the bearings themselves be damaged.)

The torque of the stepping motor 8 is absorbed at the three-point support of the yoke 5 by means of a lacquer securing point 34 on top of the otherwise freely suspended motor 8. The massive structure of part 3 and the three-point support ensure that the form tolerance is maintained. (A deformation of part 3 is hence impossible). In this embodiment, the chopper disk 9 is hence to a high degree prevented from contacting the internal wall 10.

The filtering diaphragm 24 is inserted into the front part 2 of the housing by approaching it from the front. Advantageously, the chopper, which was tested for precise running prior to this procedure, must not be opened again. Hence, the filtering diaphragm 24 particularly fulfills three functions:

1. It seals the chopper chamber 10 toward the exterior while an inserted cell containing the substance to be analyzed in turn, is sealed at the filtering diaphragm.

2. In order to avoid a dead volume ($CO_2$-trap) between the glass pane 42 and the filters 26, 27, the milled free space 37 provided on the filter side permits equalizing the pressure toward the chopper chamber 10 and 3. The form of the diaphragm and the filter type can be replaced without damaging the drive of the chopper disk 9.

Figure 9:
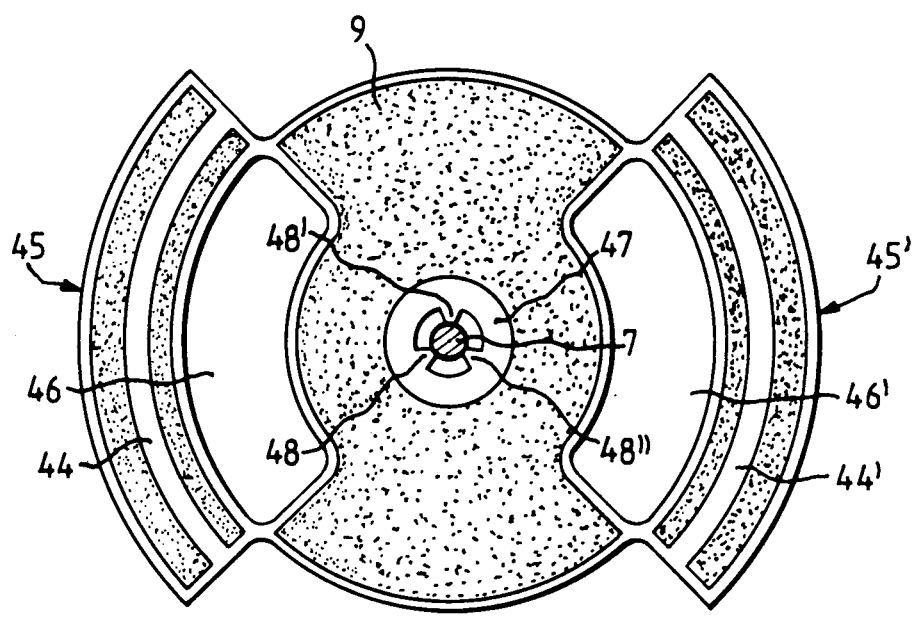
FIG. 9 is a top view of the chopper disk.

As seen in FIG. 9 the chopper disk 9 has two wings 45, 45' provided with respective reflecting surfaces 44, 44' and apertures 46 and 46'. Those reflecting surfaces that are radially outside interact with a light barrier 36 which is inserted in the opening 43 in the front part of the housing 2. The apertures that are radially inside interact with the radiation sources which can be inserted in the boreholes 21, 22 and with the cells disposed at the front part of the housing 2. The hub 41 of the chopper disk has resilient tongues 48, 48', 48" which permit this hub 41 to be locked on the motor shaft 7.

I claim:

1. Radiation chopper for use in photo-optical measurement of the absorption behavior of a solid, liquid, or gaseous substance, comprising
   a chopper disc,
   an electric motor having a front bearing collar and an opposed rear bearing collar for mounting said motor, and a shaft for driving said disc, said shaft having a front end passing through said front collar and a rear end passing through said rear collar,
   a rear housing part having mounting means for at least one radiation source, bearing block means having a borehole for receiving said front bearing collar therein, and integral elongate support elements extending therefrom,
   a multi-armed yoke fixed to said support elements and having a borehole for receiving said rear bearing collar therein,
   a front housing part fixed to said rear housing part to form a chopper chamber containing said chopper disc, said front housing part having support means for at least one cell containing a substance whose absorption capacity is to be measured by radiation passing from said at least one radiation source and through the chopper chamber to said at least one cell.

2. Radiation chopper as in claim 1 wherein said support elements extend in parallel from the rear part of the housing, said yoke having a plurality of arms which are fixed to respective support elements, and central portion joining said arms and provided with a counter bearing for the motor shaft.

3. Radiation chopper as in claim 2 wherein said counter bearing comprises a setting screw which acts on the rear end of the motor shaft to adjust the axial tolerance of the shaft.

4. Radiation chopper as in claim 3 wherein said counter bearing further comprises a bushing screwed into said central portion of said yoke, said setting screw being received in said bushing.

5. Radiation chopper as in claim 1 wherein the support elements are uniformly distributed on a circle wherein the bearing block having the borehole for supporting the front bearing collar of the motor is provided in the center of the circle.

6. Radiation chopper as in claim 1 wherein the longitudinal axes of the support elements, of the bearing block means, and of the mounting means for the radiation sources are disposed parallel to one another.

7. Radiation chopper as in claim 2 wherein the front part of the housing has a flat recess which forms, together with the rear part of the housing, the chopper chamber, said support means for said at least one test cell opening into this recess, said support means having at least one axis which runs parallel to the longitudinal axes of the support elements and of the motor shaft and perpendicular to the bottom of the flat recess.

8. Radiation chopper as in claim 1 wherein said front part has an opening therethrough which opens into the recess, said chopper further comprising a light barrier disposed in said opening, said chopper disc having reflecting surfaces located radially outward thereon which interact with said light barrier.

9. Radiation chopper as in claim 8 wherein said chopper disc comprises a pair of opposed wings each having one of said reflecting surfaces thereon, said disc further comprising a pair of opposed apertures disposed radially inward of said reflecting surfaces, said mounting means for said at least one radiation source being radially aligned with said apertures.

10. Radiation chopper as in claim 1 wherein the chopper disk has a central hub which can be slid on the shaft of the motor, and wherein the hub is configured as a locking piece having tongues contacting the shaft under a pretension.

11. Radiation chopper as in claim 1 wherein said chopper disc comprises a central hub slid onto the front end of the shaft, said yoke having a counter bearing screwed therein and a bushing with a set screw in said counter bearing, said rear end of said shaft being received in said bushing against said set screw.

* * * * *